(No Model.)

P. ARNOLD.
ANTI-FRICTION BEARING.

No. 444,311. Patented Jan. 6, 1891.

WITNESSES:
Fred G. Dieterich
Chas. R. Wright

INVENTOR
Phineas Arnold
BY
ATTORNEY

UNITED STATES PATENT OFFICE.

PHINEAS ARNOLD, OF CANAL DOVER, OHIO.

ANTI-FRICTION BEARING.

SPECIFICATION forming part of Letters Patent No. 444,311, dated January 6, 1891.

Application filed March 4, 1890. Serial No. 342,573. (No model.)

*To all whom it may concern:*

Be it known that I, PHINEAS ARNOLD, of Canal Dover, in the county of Tuscarawas and State of Ohio, have invented new and useful Improvements in Anti-Friction Bearings, of which the following is a full, clear, and exact description.

My invention relates to an improvement in anti-friction bearings especially designed for use with the axles or shafts of wheeled vehicles, and has for its object to provide a means whereby a wheel may be made to revolve upon a shaft or axle with the least possible friction.

The invention consists in the novel construction and combination of the several parts, as will be hereinafter fully set forth, and pointed out in the claim.

Reference is to be had to the accompanying drawings, forming a part of this specification, in which similar figures of reference indicate corresponding parts in both views.

Figure 1:
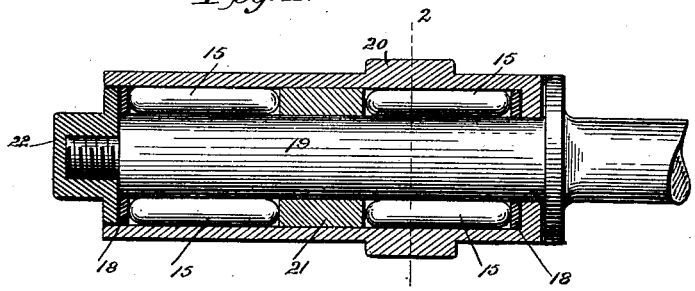
Figure 2:
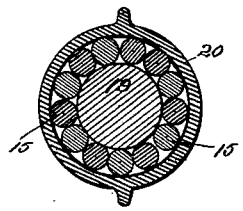

Figure 1 is a longitudinal section through a journal-box having my invention applied, and Fig. 2 is a transverse section on line 2 2 of Fig. 1.

Referring to the drawings, 19 represents an axle-spindle, 20 a journal-box, and 22 the nut on the end of the spindle. Within the box 20 are arranged the two sets of friction-rollers 15, having spherical ends, one set being separated from the other by a central steel washer 21. At each end of the box and within the same washers 18 are also employed, one steel washer contacting with the inner end surface of the box and the other washer with a cap 22, screwed upon the spindle of the axle, which cap covers the outer end of the box, which is usually open. The washers serve as bearings for the ends of the friction-rollers, and being made of steel and the ends of the rollers spherical there will be but little friction between them. This bearing is especially adapted for use with all kinds of wheeled vehicles, being particularly desirable for the bearings of drier-cars for brick, lumber, &c.; also for mining-cars and other vehicles of similar nature.

Having thus described my invention, I claim as new, and desire to secure by Letters Patent—

In an anti-friction bearing, the combination, with the axle-spindle, the journal-box 20, having open outer end, and the cap 22, screwed on the end of the axle-spindle and covering the outer end of the journal-box, of the washers 18, one resting against the inner surface of the box and the other against the inner surface of the cap, the central washer 21, the said washers fitting loosely within the journal-box, and the two sets of independent friction-rollers 15, having spherical ends and arranged between the central and end washers, substantially as herein shown and described.

PHINEAS ARNOLD.

Witnesses:
JNO. C. HELWIG,
GEO. W. BETSCHER.